United States Patent
Kameda et al.

(10) Patent No.: US 10,843,115 B2
(45) Date of Patent: Nov. 24, 2020

(54) METHOD OF REMOVING IMPURITIES

(71) Applicant: CHIYODA CORPORATION, Kanagawa (JP)

(72) Inventors: Takao Kameda, Yokohama (JP); Noboru Takei, Yokohama (JP); Kazuya Kumagai, Yokohama (JP); Sosuke Kido, Yokohama (JP); Masataka Uemura, Yokohama (JP)

(73) Assignee: CHIYODA CORPORATION, Kanagawa (JP)

( * ) Notice: Subject to any disclaimer, the term of this patent is extended or adjusted under 35 U.S.C. 154(b) by 0 days.

(21) Appl. No.: 16/282,784

(22) Filed: Feb. 22, 2019

(65) Prior Publication Data
US 2019/0184325 A1    Jun. 20, 2019

Related U.S. Application Data

(63) Continuation of application No. PCT/JP2016/074673, filed on Aug. 24, 2016.

(51) Int. Cl.
*B01D 47/02* (2006.01)
*F01N 3/04* (2006.01)
*B01D 47/04* (2006.01)

(52) U.S. Cl.
CPC .......... *B01D 47/021* (2013.01); *B01D 47/04* (2013.01); *F01N 3/04* (2013.01)

(58) Field of Classification Search
None
See application file for complete search history.

(56) References Cited

U.S. PATENT DOCUMENTS 3,155,472 A * 11/1964 Huppke ................. B01D 47/14
                                                              96/179
3,687,425 A *  8/1972 Katz ..................... B01D 47/021
                                                              261/114.1
(Continued)

FOREIGN PATENT DOCUMENTS

JP    H01159027 A    6/1989
JP    H049570 B2    2/1992
(Continued)

OTHER PUBLICATIONS

International Preliminary Report on Patentability corresponding to Application No. PCT/JP2016/074673; dated Feb. 26, 2019.
(Continued)

*Primary Examiner* — Christopher P Jones
*Assistant Examiner* — Phillip Y Shao
(74) *Attorney, Agent, or Firm* — Cantor Colburn LLP (57) ABSTRACT

The impurity removal method removes impurities in an exhaust gas and includes forming a froth layer in a tank, by blowing the exhaust gas into an absorbing liquid contained in the tank via a gas dispersion pipe, wherein, given that a proportion of the gas occupying the froth layer is defined as a gas holdup, impurities such as soot dust included in a gas such as an exhaust gas is removed efficiently and at a low cost by setting a gas holdup in the froth layer to be 0.4~0.9, setting a height of the froth layer to be 0.2~1.8 m, and setting a gas-liquid contact area per unit volume of the froth layer to be 1500~2500 $m^2/m^3$.

3 Claims, 4 Drawing Sheets

(56) References Cited

U.S. PATENT DOCUMENTS

| | | | | |
|---|---|---|---|---|
| 4,000,992 A * | 1/1977 | Cole, Jr. | ................ | B01D 47/06 |
| | | | | 95/150 |
| 6,616,733 B1 * | 9/2003 | Pellegrin | ................ | B01D 47/04 |
| | | | | 95/150 |
| 2002/0023541 A1 * | 2/2002 | Sanchez | ............... | B01D 47/021 |
| | | | | 96/340 |
| 2003/0177904 A1 * | 9/2003 | Broadbent | ............. | B01D 47/04 |
| | | | | 95/154 |
| 2009/0081096 A1 * | 3/2009 | Pellegrin | ................ | B01D 47/04 |
| | | | | 423/232 |

FOREIGN PATENT DOCUMENTS

| | | |
|---|---|---|
| JP | H10165801 A | 6/1998 |
| JP | H1190172 A | 4/1999 |
| JP | 3734291 B2 | 1/2006 |
| JP | 4616142 B2 | 1/2011 |
| JP | 2013000722 A | 1/2013 |
| JP | 2014237073 A | 12/2014 |

OTHER PUBLICATIONS

International Search Report corresponding to Application No. PCT/JP2016/074673; dated Sep. 27, 2016.

Office Action corresonding to corresponding Indian Patent Application No. 201937010122; dated Jan. 29, 2020.

\* cited by examiner

METHOD OF REMOVING IMPURITIES

CROSS REFERENCE TO RELATED APPLICATIONS

This application is a continuation under 35 U.S.C. § 120 of PCT/JP2016/074673, filed Aug. 24, 2016, which is incorporated herein reference.

BACKGROUND OF THE INVENTION

Field of the Invention

The present invention relates to a method of removing impurities such as soot dust included in a gas such as an exhaust gas.

Background Art

A method of bringing an exhaust gas that includes an environmental pollutant (impurities) such as $SO_2$ and soot dust into contact with an absorbing liquid to remove impurities from the exhaust gas is widely known as a wet exhaust gas treatment method.

For example, a desulfurization method in which an absorbing liquid is contained in the lowermost room of a sealed tank partitioned into two or three rooms inside, an exhaust gas is blown into the absorbing liquid for desulfurization via a large number of exhaust gas dispersion pipes fitted to a partition plate that defines the lowermost room and the room above, and the purified exhaust gas is discharged from the lowermost room or guided from the lowermost room to the uppermost room and discharged (see patent documents 1~4).
patent document 1: JP patent 3734291
patent document 2: JP patent 4616142
patent document 3: JP publication 4-9570
patent document 4: JP publication 3-70532

SUMMARY OF THE INVENTION

There have been abundant studies on the desulfurization method as described that are directed to prevention of a scaling trouble in the apparatus, automatic control of the apparatus, and solutions to a technical problem encountered in the apparatus operation such as improvement in the durability of the apparatus, to a problem created in associated with an increase in the size of the apparatus, etc., and massive technological advances have been made. However, in respect of the issue of economic efficiency such as reduction in the apparatus cost, reduction in the apparatus operation cost, etc., or in respect of the stability of the apparatus operation, etc., we have not reached a satisfactory stage yet.

Moreover, the aforementioned patent documents 1~4 do not explicitly discuss the detail of a froth layer that embodies a gas-liquid contact area. Nor has the related art provided sufficient performance to remove soot dust that includes fine particles of submicron order exemplified by PM2.5.

The invention addresses the above-described issue, and a general purpose thereof is to provide a impurity removal method capable of removing impurities such as soot dust included in a gas such as an exhaust gas efficiently and at a low cost.

To achieve the purpose, an impurity removal method according to the present invention includes: forming a froth layer in a tank, by blowing a gas including impurities into an absorbing liquid contained in the tank via a gas dispersion pipe, wherein (i) a gas holdup in the froth layer is set to be 0.4~0.9, and (ii) a height of the froth layer is set to be 0.2~1.8 m.

Further, it is preferred to set the gas holdup to be 0.5~0.8 and the height of the froth layer to be 0.4~1.2 m.

The gas holdup in the froth layer is set to be 0.4~0.9 for the following reasons.

The gas holdup less than 0.4 results in failure to secure a sufficient gas-liquid contact area, significant reduction in the removal performance (impurity removal efficiency), and failure to achieve desired performance.

Further, the gas holdup in excess of 0.9 produces a short path gas in the froth layer and prevents formation of a stable froth layer, which is not preferred. It also requires a large amount of gas blown into the liquid and excessive energy input to the exhaust gas dispersion pipe.

The height of the froth layer is set to be 0.2~1.8 m for the following reasons.

The height of the froth layer less than 0.2 m results in failure to secure a sufficient gas-liquid contact time, significant reduction in the removal performance (impurity removal efficiency), and failure to achieve desired performance.

Further, the height of the froth layer more than 1.8 m makes it necessary to secure a large distance from the froth layer top end to the gas outlet port opening in order to prevent the mist containing solid particles from being discharged out of the system to accompany the purified exhaust gas. The resultant large device height is economically disadvantageous, and the excessive energy required to blow the gas into the liquid is unfavorable.

According to the present invention, impurities such as soot dust included in a gas such as an exhaust gas or gaseous toxic substances exemplified by $SO_x$ and hydrogen chloride are removed efficiently and at a low cost by setting the gas holdup in the froth layer to be 0.4~0.9 and setting the height of the froth layer to be 0.2~1.8 m.

In particular, soot dust that includes fine particles of submicron order, which cannot be easily collected by ordinary removal apparatuses of liquid dispersal type configured to spray a liquid, can be collected and removed.

In the above-described configuration of the present invention, it is preferred to (iii) set the gas-liquid contact area per unit volume of the froth layer to be 1000~3000 $m^2/m^3$.

Further, it is more preferred to set the gas-liquid contact area per unit volume of the froth layer to be 1500~2500 $m^2/m^3$.

It is preferred to set the gas-liquid contact area per unit volume in the froth layer to be 1000~3000 $m^2/m^3$ for the following reasons.

By setting the gas-liquid contact area per unit volume in the gas-liquid mixture layer (froth layer) to be 1000 $m^2/m^3$ or larger, a more sufficient gas-liquid contact area is secured and a stable removal performance (impurity removal efficiency) is maintained. Another reason is that, although the higher the speed of gas ejection from the exhaust gas ejection hole in the gas dispersion pipe, the finer the bubble and the narrower the distribution of bubble diameters with the result that the removal performance (impurity removal efficiency) is improved, a large gas ejection speed will also increase the energy consumed in the gas dispersion pipe (increase the pressure loss associated with the ejection) so that the gas-liquid contact area set to be 3000 $m^2/m^3$ or smaller can inhibit excessive energy consumption, while also maintaining a stable removal performance (impurity removal efficiency) at the same time.

Such a configuration secures a sufficient gas-liquid contact area and so makes it possible to remove impurities efficiently and at a low cost and also to inhibit energy consumption required in the gas dispersion pipe.

In the configuration of the present invention described above, the impurities may include soot dust in the gas, or impurities having particle diameters of 0.1~10 μm may be included in the gas.

Such a configuration achieves a higher removal efficiency than the related art for the purpose of removing, in particular, soot dust or impurities having particle diameters of 0.1~10 μm from a gas.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

A description will be given of an embodiment of the present invention with reference to the drawings.

Figure 1:
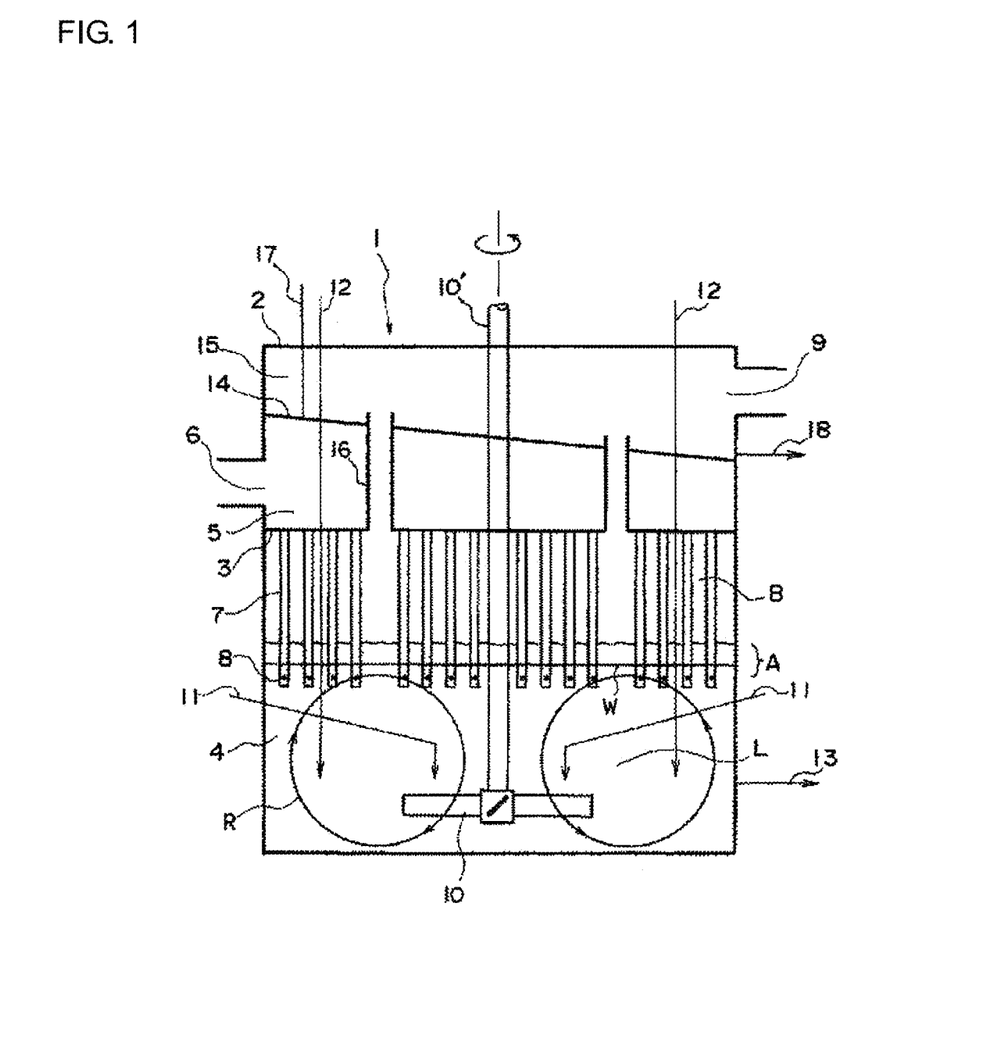
FIG. 1 schematically shows an example of an impurity removal apparatus according to an embodiment of the present invention.

FIG. 1 schematically shows an example of an impurity removal apparatus of a three-room structure. Referring to FIG. 1, reference numeral 1 denotes a desulfurization apparatus, 2 denotes a sealed tank, 3 denotes a first partition plate, 4 denotes a first room, 5 denotes a second room, 6 denotes an exhaust gas introduction port, 7 denotes an exhaust gas dispersion pipe, 8 denotes an exhaust gas ejection hole, 9 denotes an exhaust gas discharge port, 10 denotes a stirring machine, 10' denotes a stirring shaft, 11 denotes an absorbing agent supply pipe, 12 denotes an oxidation air supply pipe, 13 denotes an absorbing liquid extraction pipe, 14 denotes a second partition plate, 15 denotes a third room, 16 denotes an exhaust gas ascending tube, 17 denotes a cleaning liquid supply pipe, 18 denotes a cleaning liquid discharge pipe, L denotes an absorbing liquid, W denotes a stationary liquid surface of the absorbing liquid, A denotes a gas-liquid mixture layer (froth layer), and B denotes a solid-liquid separation space.

The impurity removal apparatus shown in FIG. 1 is formed as a structure of three rooms including a first room 4, a second room 5, and a third room 15 by partitioning the interior of the sealed tank 2 by a first partition plate 3 and a second partition plate 14. The first partition plate 3 and the second partition plate may be any of a horizontal plate, a plate in a staircase pattern, a tilted plate, etc. It is particularly preferred to use a tilted plate. The first room 4 is a room configured to contain an absorbing liquid that a gas including impurities is blown into via a gas dispersion pipe 7 and is provided in the lower part of the sealed tank 2.

The exhaust gas introduction port 6 is provided in the second room 5. The exhaust gas introduced from the exhaust gas introduction port 6 is blown into a portion below the stationary liquid surface W of the absorbing liquid L from the exhaust gas ejection hole 8 via the exhaust gas dispersion pipe 7. Above the exhaust gas ejection hole 8 is formed the gas-liquid mixture layer (froth layer) A, where soot dust and sulfurous acid gas in the exhaust gas are absorbed. A gypsum slurry containing, as an absorbing agent, a calcium compound or a compound with a calcium compound content (e.g., lime stone and/or hydrated lime) is used as the absorbing liquid L.

The purified exhaust gas spread above the gas-liquid mixture layer (froth layer) A in the first room 4 moves in the horizontal direction, ascending in the space B above the first room 4 (solid-liquid separation space). While the purified exhaust gas flows in this way, the major portion of the mist in the exhaust gas and of solid particles in the exhaust gas with relatively large particle diameters that were not removed in the gas-liquid mixture layer (froth layer) A are separated from the purified exhaust gas in the solid-liquid separation space B due to gravitational deposition and collision with the exhaust gas dispersion pipe 7. The purified exhaust gas subjected to solid-liquid separation ascends in the exhaust gas ascending tube 16 and is introduced into the third room 15. In the third room 15, the purified exhaust gas changes its direction and ceases to be an upward flow and turns into a substantially horizontal flow, and is discharged from the exhaust gas discharge port 9 after the mist and solid particles accompanying the exhaust gas are separated.

Solid particles collected on the bottom surface of the third room 15 (second partition plate 14) are detached from the surface of the second partition plate 14 by supplying a liquid intermittently or continuously from the cleaning liquid supply pipe 17 and are discharged from one or more cleaning liquid discharge ports 18 along with the cleaning liquid. The cleaning liquid is exemplified by a gypsum-containing slurry, an absorbing liquid from which gypsum is separated, water, seawater, etc.

We have found that impurities such as soot dust included in the exhaust gas can be removed efficiently and at a low cost on a continuous basis, by configuring the elements forming the gas-liquid mixture layer (froth layer) A as given in (i) and (ii) below in the process of forming the gas-liquid mixture layer (froth layer) A in the first room 4 by blowing the exhaust gas into the absorbing liquid contained in the first room 4 of the sealed tank 1 via the exhaust gas dispersion pipe 7 as described above.

(i) The gas holdup in the froth layer is set to be 0.4~0.9

(ii) The height of the froth layer is set to be 0.2~1.8 m.

The gas holdup means a proportion of the gas in the gas-liquid mixture layer (froth layer) A. The relationship between the gas holdup φ, the height H of the gas-liquid mixture layer (froth layer) A, and the gas blowing depth L is given by the following expression. The height H of the gas-liquid mixture layer (froth layer) A denotes the length from the center of the exhaust gas ejection hole 8 to the top end of the gas-liquid mixture layer (froth layer) A in the vertical direction, and the gas blowing depth L denotes the length from the center of the exhaust gas ejection hole 8 to the stationary liquid surface W of the absorbing liquid L occurring before the gas is blown into the liquid.

$$H = L \times 1/(1-\varphi)$$

The elements forming the gas-liquid mixture layer (froth layer) A are set as given by (1) and (ii) for the following reasons.

The gas holdup less than 0.4 results in failure to secure a sufficient gas-liquid contact area, significant reduction in the removal performance (impurity removal efficiency), and failure to achieve desired performance. Meanwhile, the gas holdup in excess of 0.9 produces a short path gas in the gas-liquid mixture layer (froth layer) A and prevents formation of a stable gas-liquid mixture layer (froth layer) A, which is not preferred. It also requires a large amount of gas blown into the liquid and excessive energy input to the exhaust gas dispersion pipe 7. Accordingly, the gas holdup is set to 0.4~0.9.

Figure 2:
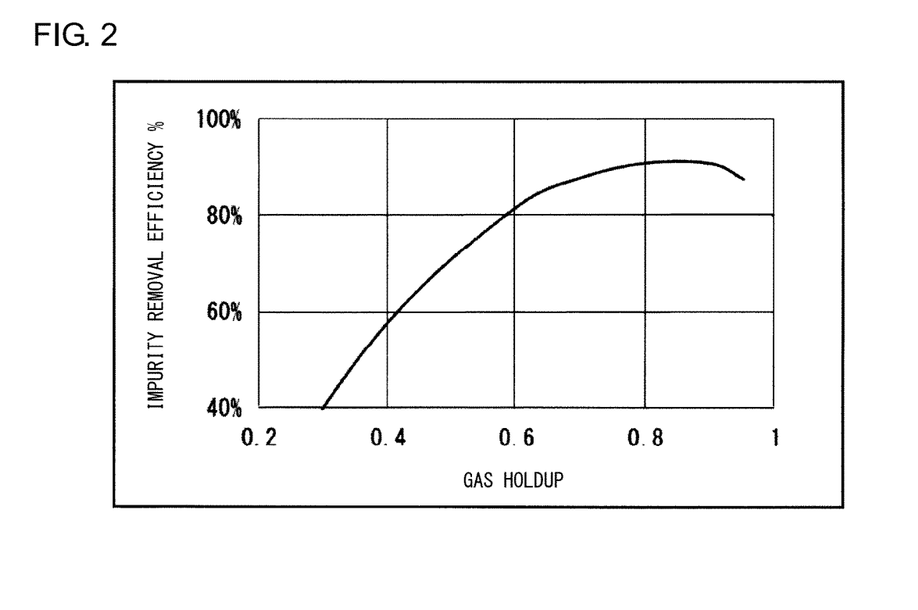
FIG. 2 is a graph illustrating a method of removing impurities according to the embodiment and shows a relationship between the efficiency of removing impurities and the gas holdup.

Further, as shown in FIG. 2, the rate of increase in the removal performance (impurity removal efficiency) begins to drop beyond the gas holdup of 0.5. Beyond 0.8, the removal performance (impurity removal efficiency) peaks out.

It is therefore preferred to set the gas holdup to be 0.5~0.8 from the perspective of the relationship in FIG. 2 and the energy consumption.

Further, the height of the gas-liquid mixture layer (froth layer) A less than 0.2 m results in failure to secure sufficient a gas-liquid contact time, significant reduction in the removal performance (impurity removal efficiency), and failure to achieve desired performance. Meanwhile, the height of the gas-liquid mixture layer (froth layer) A more than 1.8 m makes it necessary to secure a large distance from the froth layer top end to the gas outlet port opening (the exhaust gas discharge port 9) in order to prevent the mist containing solid particles from being discharged out of the impurity removal apparatus 1 to accompany the purified exhaust gas. The resultant large device height is economically disadvantageous, and the excessive energy required to blow the gas into the liquid is unfavorable. Accordingly, the height of the froth layer is set to be 0.2~1.8 m.

Figure 3:
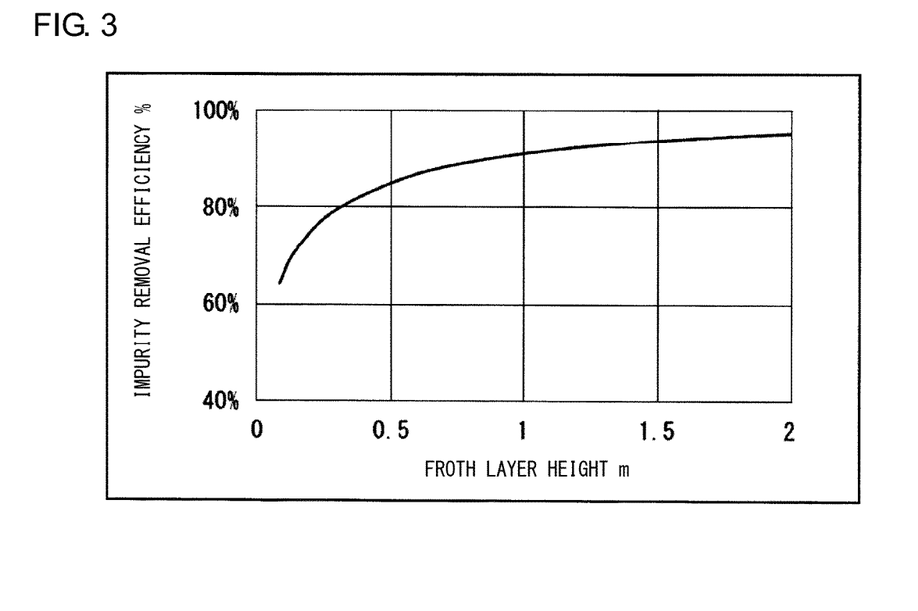
FIG. 3 is a graph showing a relationship between the impurity removal efficiency and the froth layer height.

Further, as shown in FIG. 3, the rate of increase in the removal performance (impurity removal efficiency) begins to drop beyond the froth layer height of 0.4 m. Beyond 1.2 m, the removal performance (impurity removal efficiency) peaks out.

It is therefore preferred to set the height of the gas-liquid mixture layer (froth layer) A to be 0.4~1.2 m from the perspective of the relationship in FIG. 3 and the energy consumption.

We have also found that impurities such as soot dust included in the exhaust gas can be removed efficiently and at a low cost on a continuous basis, by (iii) setting the gas-liquid contact area per unit volume in the froth layer to be 1000~3000 $m^2/m^3$.

The gas-liquid contact area per unit volume in the froth layer is defined as described above because, by setting the gas-liquid contact area per unit volume in the gas-liquid mixture layer (froth layer) A to be 1000 $m^2/m^3$ or larger, a more sufficient gas-liquid contact area is secured and the removal performance (impurity removal efficiency) is maintained in a stable manner. Another reason is that, although the higher the speed of gas ejection from the exhaust gas ejection hole 8 of the exhaust gas dispersion pipe 7, the finer the bubble and the narrower the distribution of bubble diameters with the result that the removal performance (impurity removal efficiency) is improved, a large gas ejection speed will also increase the energy consumed in the exhaust gas dispersion pipe 7 (increase the pressure loss associated with the ejection) so that the gas-liquid contact area set to be 3000 $m^2/m^3$ or smaller can inhibit excessive energy consumption, while also maintaining a stable removal performance (impurity removal efficiency) at the same time.

Figure 4:
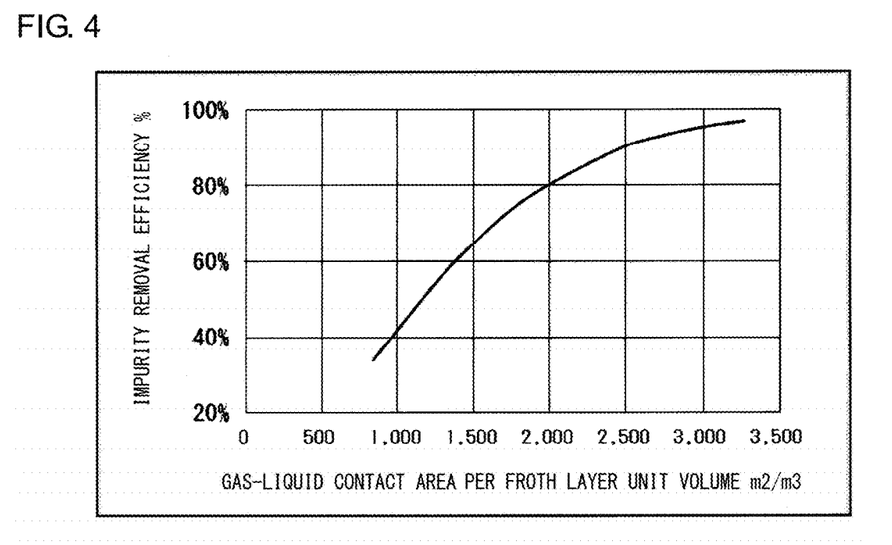
FIG. 4 is a graph showing a relationship between the impurity removal efficiency and the gas-liquid contact area per unit volume in the froth layer.

Further, as shown in FIG. 4, the rate of increase in the removal performance (impurity removal efficiency) begins to drop beyond the gas-liquid contact area per froth layer unit volume of 1500 $m^2/m^3$. Beyond 2500 $m^2/m^3$, the removal performance (impurity removal efficiency) peaks out.

It is therefore preferred to set the gas-liquid contact area per froth layer unit volume to be 1500~2500 $m^2/m^3$ from the perspective of the relationship in FIG. 4 and the energy consumption.

The gas-liquid contact area SA per unit froth layer volume is calculated as follows.

$$SA=Sb*N/Vf$$

Sb: Surface area of an average single bubble forming the froth layer $Sb=\pi*db2$ db: Bubble diameter N: Number of bubbles in the froth layer Vf: Froth layer volume $Vf=L*1/(1-\varphi)*S$ $N=Vf*\varphi/Vb$ $Vb=\frac{1}{6}*\pi*db3$ (volume of a single bubble)

L: Gas blowing depth (the depth from the center of the exhaust gas ejection hole of the exhaust gas dispersion pipe to the stationary liquid surface occurring before the gas is blown into the liquid)

$\varphi$: Gas holdup

S: Froth layer cross-sectional area (the horizontal cross-sectional area obtained by subtracting the sum of the horizontal cross-sectional areas of the structures that the purified exhaust gas cannot pass through (e.g., the horizontal cross-sectional area of the exhaust gas dispersion pipes 7) from the horizontal cross-sectional area of the gas-liquid mixture layer (froth layer) A The elements forming the gas-liquid mixture layer (froth layer) are set as given by (i)~(iii) above by appropriately setting the equivalent inner diameter of the exhaust gas dispersion pipe 7, the equivalent diameter of the exhaust gas ejection hole 8, the ejection speed from the exhaust gas ejection hole 8, the distance from the average position of the central points of the plurality of exhaust gas ejection holes 8 to the opening at the lower end of the associated exhaust gas dispersion pipe 7, the average rise speed of the purified exhaust gas in the first room 4, the average horizontal speed of the purified exhaust gas in the first room 4, the speed of the purified exhaust gas rising in the exhaust gas ascending tube 16, etc.

The equivalent inner diameter of the exhaust gas dispersion pipe and the equivalent diameter of the exhaust gas ejection hole are given by the following expressions.

Equivalent inner diameter of the exhaust gas dispersion pipe=$(4 \times A)/B$

A: Horizontal cross-sectional area of the inner space at the position where the exhaust gas ejection hole is provided in the exhaust gas dispersion pipe B: Length of the circumference encircling the horizontal cross-section of the inner space at the position where the exhaust gas ejection hole is provided in the exhaust gas dispersion pipe Equivalent diameter of the exhaust gas ejection hole=$(4 \times C)/D$ C: Area of the exhaust gas ejection hole D: Length of the circumference of the exhaust gas ejection hole The average rise speed of the purified exhaust gas in the first room 4 is a speed based on the horizontal cross-sectional area obtained by subtracting the sum of the horizontal cross-sectional areas of the structures that the purified exhaust gas cannot pass through (e.g., the horizontal cross-sectional area of the exhaust gas dispersion pipes 7) from the horizontal cross-sectional area in the space B above the gas-liquid mixture layer (froth layer) A.

The average horizontal speed of the purified exhaust gas in the first room 4 is a speed based on the vertical cross-sectional area near the opening at the lower end of the exhaust gas ascending tube 16 in the space B above the gas-liquid mixture layer A.

The exhaust gas dispersion pipe 7 may have a desired cross-sectional shape such as a polygon (e.g., circle, triangle, quadrangle, hexagon) and a trough. A plurality of exhaust gas ejection holes 8 open on the side wall of the exhaust gas dispersion pipe 7 at positions of a substantially regular height from the horizonal surface. The exhaust gas ejection holes may have a desired shape such as a circle, triangle, quadrangle, hexagon, star or may be shaped in a slit. The exhaust gas ejection holes may be arranged in an array at a regular height relative to the exhaust gas dispersion pipe. Alternatively, the exhaust gas ejection holes may be arranged in a two, three, or more arrays having different heights.

The opening at the lower end of the exhaust gas dispersion pipe 7 may be shaped to have a simple horizontal end face, an end face inclined at a desired angle, or a saw blade pattern, or shaped to have a plurality of notches.

The transversal cross-section of the exhaust gas ascending tube 16 may have a desired shape such as a circle, square, rectangle, etc.

A description will now be given of an experiment.

The elements forming the gas-liquid mixture in the froth layer A are set as given by (i)~(iii) above.

The size of the exhaust gas dispersion pipe (sparger), diameter of the exhaust gas ejection hole (hole diameter), and other conditions are provided as listed in Table 1.

The inlet port in Table 1 means an introduction port for introducing the exhaust gas into the experiment device in this experiment, and the outlet port means a discharge port for discharging, from the experiment device, the exhaust gas from which the impurities etc. are removed.

The hole diameter means the equivalent diameter of the exhaust gas ejection hole, the hole count means the number of exhaust gas ejection holes per one exhaust gas dispersion pipe, the hole ejection speed means the flow rate of the exhaust gas ejected from exhaust gas ejection hole.

The liquid immersion depth means the gas blowing depth and is the length from the center of the exhaust gas ejection hole to the stationary liquid surface of the absorbing liquid occurring before the gas is blown into the liquid. The froth layer height means the length from the center of the exhaust gas ejection hole to the top end of froth layer in the vertical direction.

The froth layer gas void tower speed means the average rise speed of the purified exhaust gas in the first room 4.

TABLE 1

| INLET PORT | AMOUNT OF GAS | 3,000 | m³N/h-dry |
|---|---|---|---|
| | SOOT DUST CONCENTRATION | 13.00 | mg/m³N-dry |
| | HOLE DIAMETER | 27 | mm |

TABLE 1-continued

| | HOLE COUNT | 9 | |
|---|---|---|---|
| | HOLE EJECTION SPEED | 22.6 | m/sec |
| | IMMERSION LIQUID DEPTH | 220 | mm |
| | FROTH LAYER HEIGHT | 468 | mm |
| | EQUIVALENT DIAMETER OF EXHAUST GAS DISPERSION PIPE | 101.6 | |
| | FROTH LAYER GAS VOID TOWER SPEED | 0.87 | m/sec |
| | FROTH LAYER CROSS-SECTIONAL AREA | 1.13 | m² |
| | FROTH LAYER GAS HOLDUP | 0.53 | |
| OUTLET PORT | AMOUNT OF GAS | 3,000 | m³N/h-dry |
| | SOOT DUST CONCENTRATION | 2.09 | mg/m³N-dry |
| TOTAL DUST REMOVAL EFFICIENCY | 84% | | |
| AVERAGE PARTICLE SIZE INLET PORT | 2.2 micron (Dp50) | | |
| AVERAGE PARTICLE SIZE OUTLET PORT | 1.3 micron (Dp50) | | |

Figure 5:
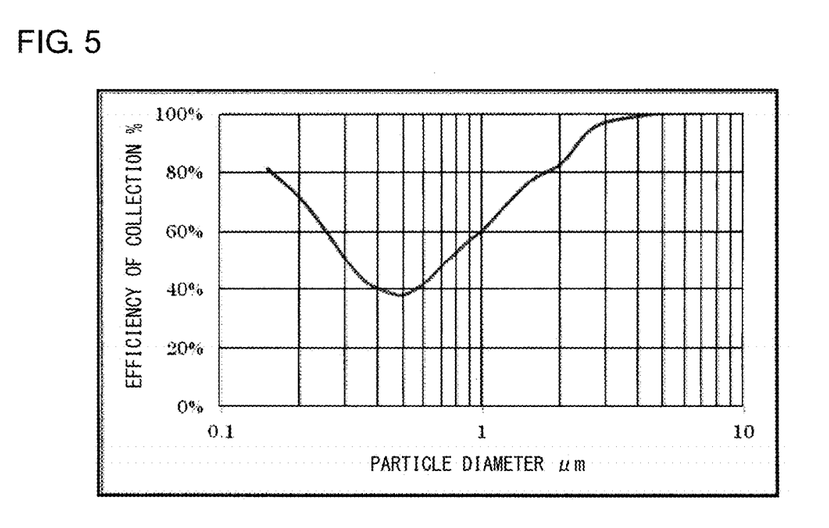
FIG. 5 is a graph showing the efficiency (impurity removal efficiency) of collecting soot dust particles in an exhaust gas identified for each particle diameter.

FIG. 5 shows the result of the experiment.

As shown in FIG. 5, the experiment demonstrated that soot dust that includes fine particles of submicron order that cannot be easily collected by ordinary removal apparatuses of liquid dispersal type can be collected and removed.

As described above, impurities such as soot dust included in a gas such as an exhaust gas or gaseous toxic substances exemplified by $SO_x$ and hydrogen chloride are removed efficiently and at a low cost on a continuous basis since the gas holdup in the gas-liquid mixture layer (froth layer) A is set to be 0.4~0.9 and the height of the gas-liquid mixture layer (froth layer) A is set to be 0.2~1.8 m.

Figure 6:
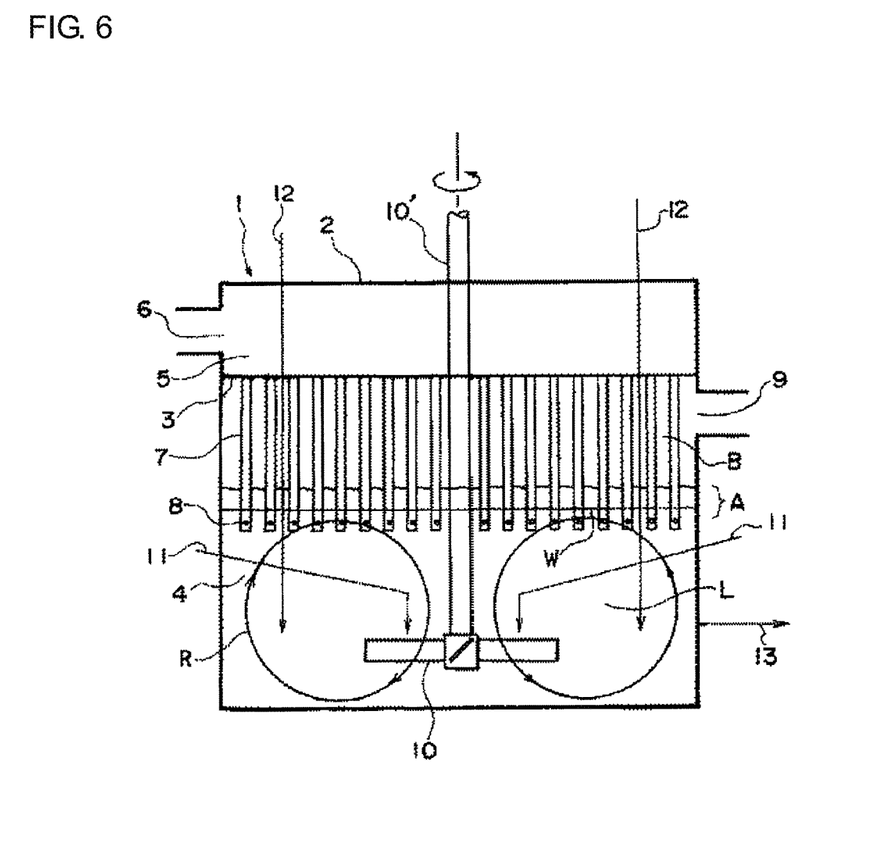
FIG. 6 is a schematic diagram showing an example of another exemplary impurity removal apparatus according to the embodiment.

FIG. 6 is a schematic diagram showing an exemplary impurity removal apparatus of a two-room structure. In FIG. 1 and FIG. 6, like numerals denote like elements.

In the impurity removal apparatus shown in FIG. 6, the exhaust gas purified by being brought in to contact with an absorbing agent in the first room 4 is maintained at an average rise speed of 0.5~5 m/s, and, preferably, 0.7~4 m/s, and at an average horizontal speed of 8 m/s or lower, and, preferably, 6 m/s or lower and moves in the horizontal direction, ascending in the space B above the first room 4. While the purified exhaust gas flows in this way, the major portion of the mist and solid particles in the exhaust gas are separated from the exhaust gas in the solid-liquid separation space B due to gravitational deposition and collision with the exhaust gas dispersion pipe 7.

The impurity removal apparatus configured like this is equally capable, as in the case already described, of removing soot dust included in the exhaust gas or impurities like $SO_x$, etc. efficiently and at a low cost on a continuous basis by setting the elements forming the gas-liquid mixture layer (froth layer) A as given by (i)~(iii) above.

What is claimed is:

1. An impurity removal method comprising forming a froth layer in a tank, by blowing a gas including impurities into an absorbing liquid contained in the tank via a gas dispersion pipe, wherein a proportion of the gas in the froth layer is defined as a gas holdup, denoting the gas holdup as $\varphi$, a height of a gas-liquid mixture layer (froth layer) as H, and a depth of a gas flowing depth as L, the gas holdup $\varphi$ is given by $\varphi=(H-L)/H$, (i) the gas holdup in the froth layer is set to be 0.4~0.9,
(ii) (ii) a height of the froth layer is set to be 0.2~1.8 m, and
(iii) (iii) a gas-liquid contact area per unit volume of the froth layer is set to be 1500~2500 $m^2/m^3$.

2. The impurity removal method according to claim 1, wherein the impurities include soot dust in the gas.

3. The impurity removal method according to claim 1, wherein impurities having particle diameters of 0.1~10 μm are included in the gas.

\* \* \* \* \*